United States Patent [19]
Keon

[11] Patent Number: 5,108,583
[45] Date of Patent: Apr. 28, 1992

[54] FCC PROCESS USING FEED ATOMIZATION NOZZLE

[75] Inventor: Lawrence E. Keon, Robbinsville, N.J.

[73] Assignee: Mobil Oil Corporation, Fairfax, Va.

[21] Appl. No.: 424,420

[22] Filed: Oct. 20, 1989

Related U.S. Application Data

[62] Division of Ser. No. 229,670, Aug. 8, 1988, abandoned.

[51] Int. Cl.$^5$ .............................................. C10G 11/18
[52] U.S. Cl. ..................................... 208/157; 208/113; 422/145; 239/501
[58] Field of Search ............... 208/157, 113; 239/501; 422/145

[56] References Cited

U.S. PATENT DOCUMENTS

| | | | |
|---|---|---|---|
| 3,071,540 | 1/1963 | McMahon et al. | 208/157 |
| 3,152,065 | 10/1964 | Sharp et al. | 258/157 |
| 3,654,140 | 4/1972 | Griffel et al. | 208/157 |
| 4,405,444 | 9/1983 | Zandona | 208/113 |
| 4,434,049 | 2/1984 | Dean et al. | 208/157 |
| 4,523,987 | 6/1985 | Penick | 208/157 |
| 4,555,328 | 11/1985 | Krambeck et al. | 208/113 |
| 4,578,183 | 3/1986 | Chou et al. | 208/153 |
| 4,713,169 | 12/1987 | Nielsen | 208/113 |
| 4,793,913 | 12/1988 | Chessmore et al. | 208/153 |
| 4,824,557 | 4/1989 | Cartmell et al. | 208/153 |
| 4,861,459 | 8/1989 | Cetinkaya | 208/157 |

*Primary Examiner*—Anthony Mc Farlane
*Attorney, Agent, or Firm*—Alexander J. McKillop; Charles J. Speciale; Malcolm D. Keen

[57] ABSTRACT

An atomizing nozzle for injecting fluid catalytic cracking (FCC) feed into a cracking riser comprises a spray nozzle for breaking up the feed to form a conical, atomized spray of feed which is confined within an open ended nozzle pipe surrounding the spray nozzle and which extends downstream from the spray nozzle. Atomizing gas, usually steam, passes around the spray nozzle to promote further atomization and vaporization of the feed and the mixture of feed droplets and atomizing gas is passed through an orifice plate at the tip of the spray nozzle pipe to expand the spray across a greater axial distance. The atomizing system provides improved feed atomization and contact with the cracking catalyst with relatively low pressure drops.

5 Claims, 5 Drawing Sheets

FCC PROCESS USING FEED ATOMIZATION NOZZLE

This is a divisional of copending application Ser. No. 229,670, filed on Aug. 8, 1988 now abandoned.

FIELD OF THE INVENTION

This invention relates to feed injection nozzles for use in fluid catalytic cracking (FCC) units and more particularly to injection nozzles for FCC units which have improved feed atomization at lower feed pressures.

BACKGROUND OF THE INVENTION

The fluid catalytic cracking (FCC) process has achieved widespread utility in the petroleum refining industry for producing low boiling point hydrocarbon products, especially gasoline from relatively higher boiling feeds. The FCC process has, in fact, achieved a preeminent position in the refining industry in the United States for catalytic this purpose and now accounts for almost all the non-hydrogenative, cracking capacity in the industry. In current cracking units, the cracking feed, generally a gas oil from the vacuum distillation tower, is brought into contact with a hot cracking catalyst at the foot of a tall, columnar riser in which the cracking takes place. The cracking feed travels up the riser concurrently with the catalyst and at the top of the riser, the cracking products are separated from the catalyst in the disengaging vessel, commonly referred to as "reactor", conventionally employing cyclone separators for this purpose. The cracking products are then passed to the product recovery section of the unit for separation into the various cracked fractions. The separated catalyst is passed to a regenerator in which the coke laid down by the cracking process is oxidatively removed, thus restoring activity to the catalyst and, at the same time, providing heat for the endothermic cracking process by the combustion of the coke. The regenerated catalyst is then returned to the foot of the cracking riser for contact with the cracking feed.

To optimize the cracking process it is necessary to contact the feed as uniformly as possible with the catalyst so as to procure the catalyst/oil ratio which is most favorable to the desired product yield and distribution. In practice, this requirement has given rise to a considerable number of problems arising not only from the basic difficulties of achieving uniform contact between a finely divided solid (the catalyst) and a liquid (the cracking feed) but also because cracking units are usually required to handle extremely large equantities of both these components. For example, in a unit with a nominal capacity of about 100,000 Bbl/day, about 4,000 barrels of oil pass through the unit every hour and at a typical cataystt/oil ratio of 5:1, 3,200 tons of catalyst also pass by any point in the unit every hour in addition to the oil. These large quantities are difficult to handle with the utmost precision.

Proposals have been made for heating the hydrocarbon stream prior to injection into the cracking zone in the form of a vapor but not only is this uneconomic because of the high degree of preheat required it is also undesirable because it initiates undesirable, non-selective thermal cracking before the feed contacts the catalyst. It also results in excessive coking and poor product distribution even though optimum performance would be realized with an all vapor feed since the most desirable reactions occur in the vapor phase. The conventional practice has therefore been to use a liquid feed dispersed with steam with the heat of regeneration supplying heat for vaporizing the feed and for the endothermic cracking process. Unit performance can be improved by a more uniform oil feed/catalyst distribution and by atomizing the oil into droplets more closely matching the particle size of the catalyst. Droplets of 350 microns, preferably less than 100 microns, in diameter are desirable. Accordingly, there is a significant incentive for good feed atomization and various proposals have been made to achieve this.

U.S. Pat. No. 3,654,140 (Griffel) discloses a FCC feed injector which employs a spray nozzle with a helical element which imparts a circular motion to the liquid feed stream to break it up into a hollow conical sheet which disperses droplets in the cracking zone. Atomization of the feed is promoted by means of the steam which is fed into the injector nozzle in the form of an annulus around the oil stream.

The use of steam for improving the atomization of the cracking feed is, of course, well established in the industry and is described, for example, in U.S. Pat. No. 3,071,540 (McMahon) which employs a coaxial injection nozzle feeding concurrent streams of oil, steam and catalyst into the cracking reactor.

U.S. Pat. No. 3,152,065 (Sharp) describes a feed nozzle for an FCCU which has a helical form at the outlet of the nozzle to break the hydrocarbon feed up into a cone of finely dispersed droplets. Atomization of the feed is promoted by steam injected through a central injection pipe with an orifice plate facing the end of the steam conduit.

In practice, all the conventional FCC feed injectors have disadvantages of one kind or another. It may be that the degree of atomization achieved is unsatisfactory, the pressure drop required for achieving satisfactory atomization is excessive, catalyst mixing is poor or the device may not be mechanically robust or cannot be easily maintained. Alternatively, the nozzle design may place limits on the amount of steam which can be injected concurrently with the feed and this may impose limitations on the ability to achieve a given product distribution because it has been established that increased steam/oil ratios may be desirable for improved selectivity to specific products, especially gasoline, particularly for heavier feeds or higher operating pressures. There is therefore a continuing need for improved FCCU feed injection systems.

SUMMARY OF THE INVENTION

We have now devised an improved atomizing feed system for an FCCU which enhances catalyst/oil contact at the bottom of the cracking riser by spraying the cracking feed into a widely dispersed pattern of small droplets rather than by injecting the feed in a concentrated, high velocity column. The system may be readily incorporated into existing units because its requirements are similar to those of conventional multiple feed injectors. It achieves the improved feed atomization with reduced pressure drop and therefore requires a lower utility consumption for operation as well as lower installation costs by minimizing feed pump requirements. Furthermore, it permits the oil/steam ratio to be varied over wide limits and therefore permits this ratio to be adjusted in accordance with varying feedstocks in order to attain the most desirable product distribution. It is also mechanically robust and easy to maintain in commercial operation.

According to the present invention, the atomizing feed system for the FCCU comprises a spray nozzle, preferably of the helical vane type, connected to the feed cracking conduit to form the feed into a conical, atomised spray. An open-ended nozzle pipe surrounds the spray nozzle and extends downstream of the nozzle to confine the spray of cracking feed until it passes through a circularly orificed plate which expands the spray once more into a finely atomized dispersion which makes good contact with the catalyst.

In the present feed injection system, feed atomization is achieved in two stages. Within each feed injection unit, oil or a mixture of oil and steam is first charged to the spray nozzle which forms a conical, wide-angled spray of the cracking feed. The resultant spray cone is confined within the nozzle pipe which surrounds the spray nozzle for a distance downstream of the spray. In this region, the spray is contacted by an annular jet of atomizing gas, usually steam, that is accelerated and uniformly distributed around the spray. This provides a uniform mix of steam and oil within the nozzle pipe with liquid biased towards the walls of the nozzle pipe. Secondary atomization and expansion of the spray cone is achieved by means of the circular orifice in the orifice plate which is situated just inside the top edge of the nozzle pipe. The system pressure drop and droplet size can be altered during operation by diverting steam into the oil feed through the spray nozzle in which the pressure drop is higher than in the nozzle pipe up to the limit of available oil feed pressure. Diversion in this way decreases droplet size. Conversely, droplet size may be increased by increasing the flow of steam in the nozzle pipe around the spray nozzle.

In a typical unit, a number of such injection nozzles may be ranged across the bottom of the cracking riser in any arrangement which provides the desired capacity as well as the desired distribution across the riser.

THE DRAWINGS

FIGS. 5 A-E are a series of distribution diagrams showing the effect of spray nozzle and nozzle pipe configuration.

DETAILED DESCRIPTION

Figure 1:
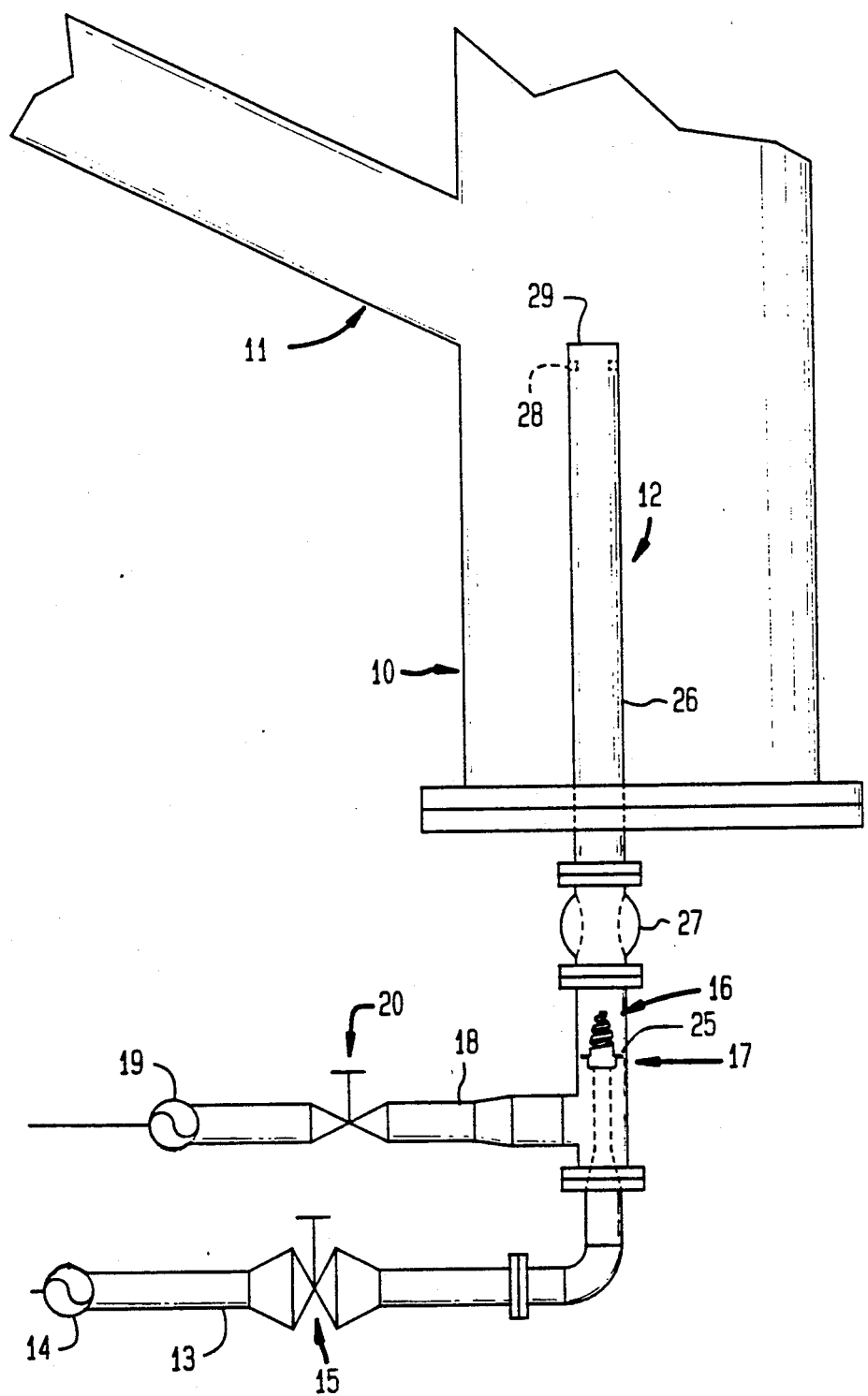
FIG. 1 is a simplified illustration of a single atomizing unit employing a spray nozzle.

Referring to the drawings, FIG. 1 shows the lower portion of a cracking riser 10 in an FCC unit with a standpipe 11 for bringing the catalyst from the regenerator (not shown). A single injection unit 12 is situated at the bottom of the riser for injecting the oil/steam mixture into the riser where it contacts the catalyst. The injection system comprises a conduit 13 for supplying the oil cracking feed either as such or as an oil/steam mixture, depending on the degree of atomization desired and the desired product distribution. The oil may comprise fresh feed such as a vacuum gas oil or fresh feed plus recycle from the FCC main column, according to the desired mode of unit operation. The oil feed enters from manifold 14 and may be adjusted by means of valve 15. The feed flows through the conduit to spray nozzle 16 which forms the feed into a conical, atomized spray which is confined within nozzle pipe 17 which surrounds the spray nozzle. An atomizing gas, usually steam, but optionally fuel gas or another gas, is introduced into nozzle pipe 17 by means of conduit 18 with the flow of steam from manifold 19 being adjusted by valve 20. The atomizing steam passes from conduit 18 into nozzle pipe 17, passing around flow restrictor collar 25 which encircles the lower portion of the body of spray nozzle 16 in order to promote flow uniformity of the atomizing steam. The flow collar also serves to accelerate the steam before it encounters the cone of spray from the spray nozzle and this accelerates the mixture of oil and steam up into the upper part of nozzle pipe 26 and into the bottom of the riser. A high capacity ball valve 27 is provided above the spray nozzle area in order to permit maintenance work on the equipment outside the riser.

The atomized oil and steam mixture passes up nozzle pipe 26 and encounters a circularly orificed plate 28 disposed just below the tip 29 of injection pipe 26. The orifice place promotes further atomization of the feed and expands the mixture of oil droplets and steam into a cone which contacts the catalyst entering the riser through standpipe 11 to promote good mixing between the oil particles and catalyst.

Figure 2:
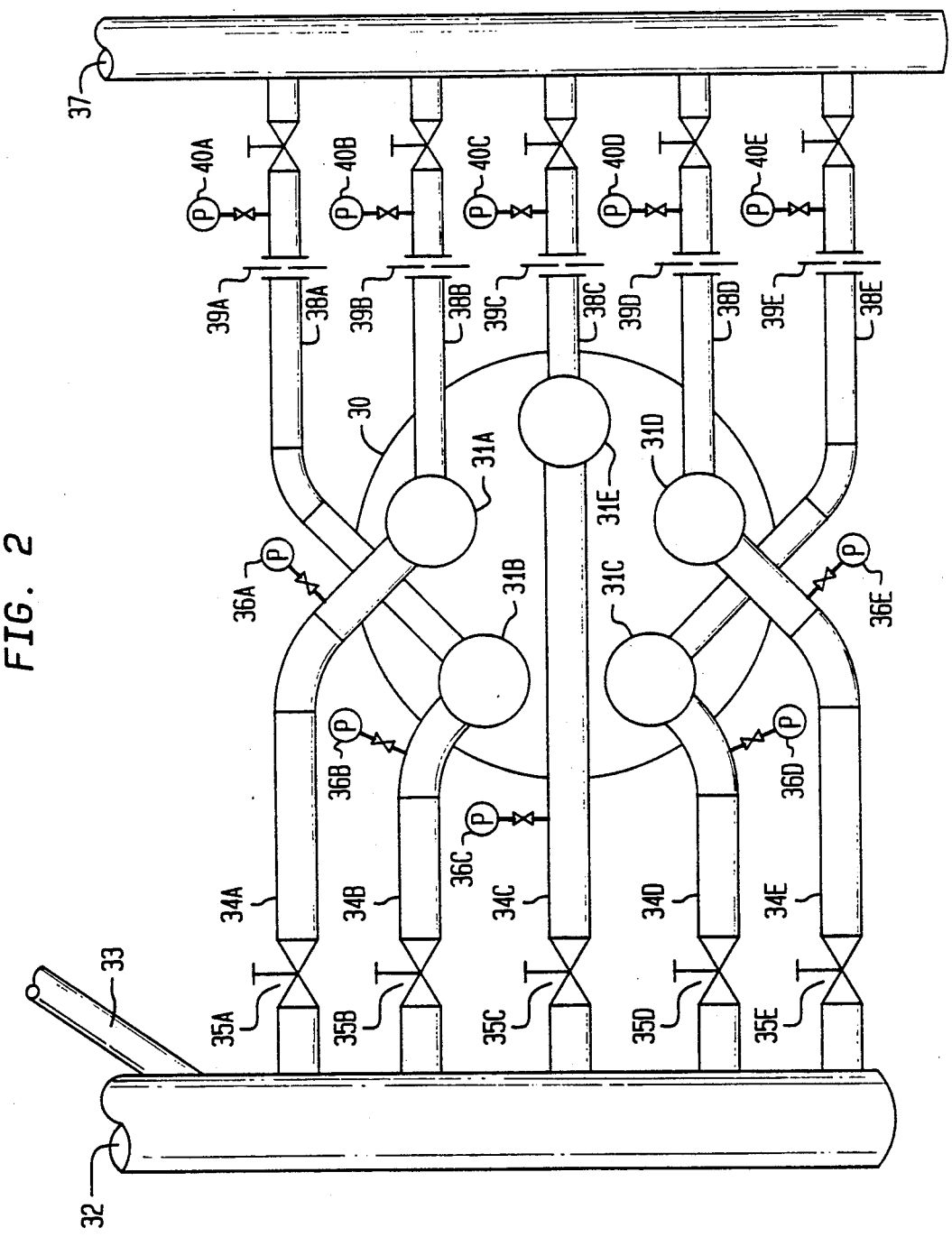
FIG. 2 is a bottom view of an FCCU riser with five atomizing units.

If desired, feed screens may be included in the oil feed line to prevent the nozzles from becoming plugged if particulate matter such as coke enters the feed system. In addition, the feed conduit system may be provided with means for injecting emergency steam in order to improve fluidization in the riser or to remove blockages when necessary. A typical riser injector system is shown in FIG. 2, using five injectors disposed evenly around the periphery of the cracking riser. As shown in FIG. 2, the cracking riser 30 has five injector units 31A to 31E disposed around the periphery of the riser, each injector unit being as shown in FIG. 1. The cracking feed is fed to the individual injector units through feed manifold 32 which is provided with an inlet 33 for emergency steam. Individual feed supply conduits 34A . . . 34E extend to each of the individual injector units with control valves 35A . . . 35E in each conduit. Pressure sensors 36A . . . 36E are also provided. Atomizing steam is supplied through steam manifold 37 with individual atomizing steam supply conduits 38A . . . 38E connected to it. Steam control valves 39A . . . 39E and pressure sensors 40A . . . 40E are also provided, as described above for FIG. 1. In a unit of this type, the standpipe for the regenerated catalyst is preferably arranged so that the catalyst flow enters the riser centered between the injection units.

Figure 3:
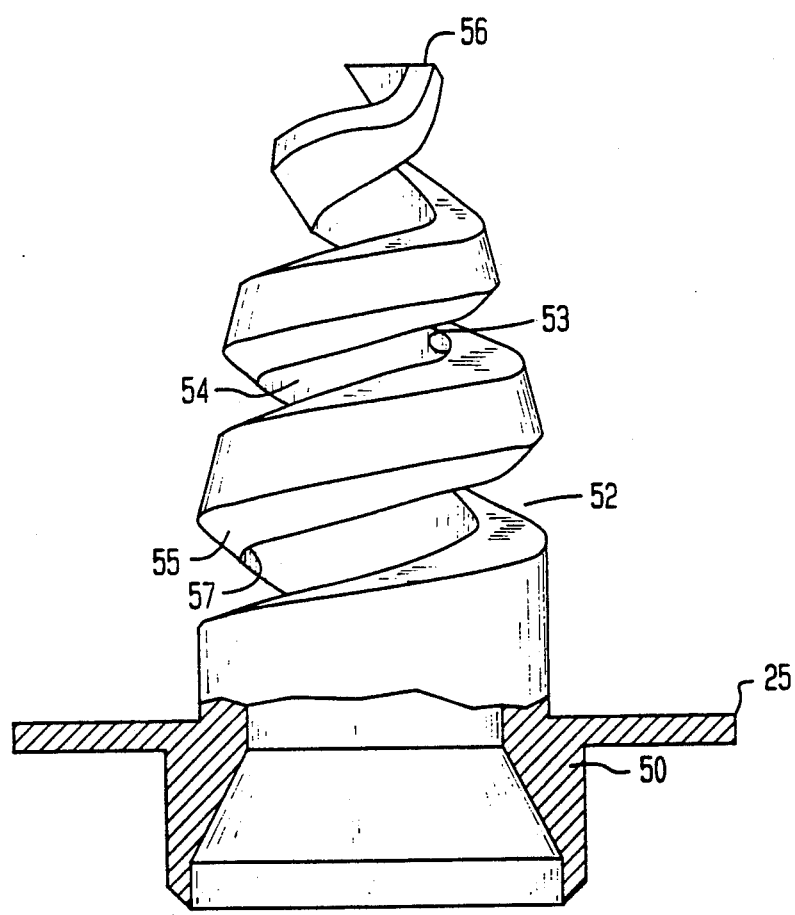
FIG. 3 is a diagram of a helical vane spray nozzle.

The first stage atomization of the cracking feed is achieved by means of a spray nozzle which breaks up the cracking feed into an atomized spray of conical configuration. The preferred type of spray nozzle for this purpose is a helical vane type spray nozzle as shown in FIG. 3. The nozzle comprises a base portion 50 of a size suitable for mating with the feed conduit and to which it may be fixed by suitable means such as welding screws. Means permitting isolation of the complete unit from the feed conduit are preferred to aboild costly delays due to catalyst removal if and when maintenance is required. The flow constrictor collar 25 is formed integrally with the body of the nozzle and, as described above, serves to promote flow uniformity of the atomizing gas around the nozzle. The functional portion of the nozzle comprises a vane 51 formed in the shape of a helix which converges axially in the direction of flow with a helical slot 52 for discharging liquid from the nozzle. The vane spirals inwardly in the direction of flow so that the inner wall 53 of the vane has an inward axial taper to form a bore 54 of generally conical or bullet-shaped configuration of reducing cross in the direction of flow through the nozzle.

Helical vane 51 has a lower spiral, helical surface 55 which extends at an angle to the axis of the nozzle radially outwardly from bore 54. Helical surface 55 extends from the base portion of the body 50 to the tip 56 of the nozzle and forms a spirally helical edge 57 with the inner surface 53 of the vane. The inner helical edge 57 has a pitch which remains substantially uniform throughout the axial length of the nozzle as it spirals inwards with the taper of inner wall 54. As the vane spirals inwardly along the length of the nozzle an increasing area of the surface projects radially inward from the axially preceding wall portion until the end portion 56 of the nozzle is reached which forms a plug at the end of the nozzle so that the feed is discharged over the end portion of the helical vane. The vane presents a continuous deflecting surface in the path of the incoming feed to peel off a sheet of the feed and as this happens, the reduction in the cross-sectional area of the bore by the inwardly spiral configuration of the helical vane maintains the feed as a homogeneous mass and reduces turbulence or disintegration of the mass into separate portions. Thus, throughout the length of the nozzle, a uniform sheet of liquid may be peeled off by the vane and atomized to form droplets.

The terminating undersurface of the vane towards the end of the spiral forms a complete turn so that the liquid forms a complete finite conical sheet on reaching the end of the nozzle to eliminate any breaks in the spray. The reduction of the conical shape of the wall reduces the width of the vane surfaces and reduces the area of contact between the vane and the liquid so that frictional losses between the liquid and the nozzle are minimized. This reduction in the outside diameter increases the atomization of the feed liquid and increases the efficiency of the nozzle.

Nozzles of this type are known for producing finely atomized liquid sprays or fog with a minimal risk of clogging and are described, for example, in U.S. Pat. No. 2,804,341 (Bete) with variants of them being disclosed in U.S. Pat. No. Re. 23,413 (Reissue of U.S. Pat. No. 2,518,116, Bete) and U.S. Pat. No. 2,612,407 (Bete). Reference is made to these patents for a description of nozzles of this type. Nozzles such as those disclosed in these patents having a spiral, helical vane for atomizing the feed may be used in the present injection nozzles, including both of the coaxially cored nozzles as disclosed in U.S. Pat. No. 2,612,407 and U.S. Pat. No. Re. 23,413 as well as the coreless nozzles disclosed in U.S. Pat. No. 2,804,341. The coreless nozzles disclosed in U.S. Pat. No. 2,804,341 have been found to give extremely good results in the present injection atomizing systems and are accordingly preferred for the present purpose. Spray nozzles generally similar to this type but without the flow restriction collar added for the purpose described above are commercially available from Bete Fog Nozzle, Inc., Greenfield, MA 01302.

The helical spray nozzles used in the present atomizing devices are employed to increase liquid loading on the walls of the nozzle pipe which causes an extremely uniform spray of atomizied fine droplets to issue from the tip orifice.

Various configurations of spray nozzle of the helical vane type are available producing full and hollow cone spray patterns with cone angles typically varying from about 50° to about 120° and even wider angle cone patterns are available e.g. 150°, 170° or even 180° for extra wide spray patterns. It has been found that the best atomization is achieved with a wide angle conical spray pattern of at least 90° and preferably about 120°. A hollow cone spray pattern has been found to give good results in this application but depending upon the individual configuration, full cone spray patterns may also be used. Best results were obtained with the Bete TF64W pattern helical vane spray nozzle, producing a wide angle (120°) hollow cone spray pattern.

As shown in FIG. 1, the oil droplet/steam mixture travels up the injection pipe a significant distance before emerging from the injection pipe into the riser. The atomization of the feed is completed by means of the orifice plate near the tip of the nozzle pipe. It has been found that without the orifice plate, the effects of the pipe severely limit the quality of the feed atomization. Although the helical vane nozzles are successful in achieving improved contact between the feed and the atomizing gas, the sprays may emerge from the nozzle pipe in a dense jet providing low quality atomization and mixing with the catalyst. The converse arrangement with the helical spray nozzle above the top of the nozzle pipe may be incapable of resisting catalyst erosion and could not be maintained without a total unit shutdown. To correct this problem, a spray expansion device is provided near the top of the nozzle pipe in the form of a circularly apertured orifice plate, preferably with a square edge orifice. Because the orifice is relatively large, plugging by particulates which emerge through the spray nozzle is not a problem and in addition, large orifice size permits high throughput rates appropriate for a cracking unit. The combination of the helical spray nozzle and the tip orifice provides a significant benefit to the spray pattern; removal of the nozzle results in a less evenly distributed spray.

Figure 4:
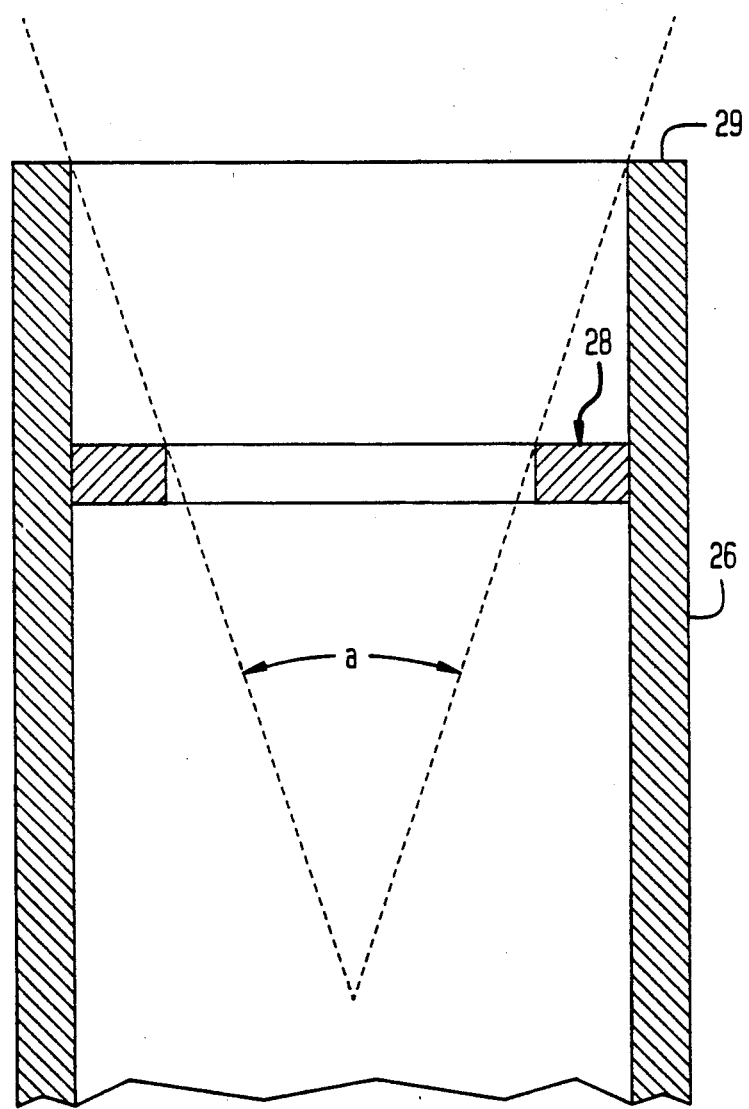
FIG. 4 is a schematic showing the relationship between the orifice plate and the tip of the nozzle pipe.
Figure 5A:
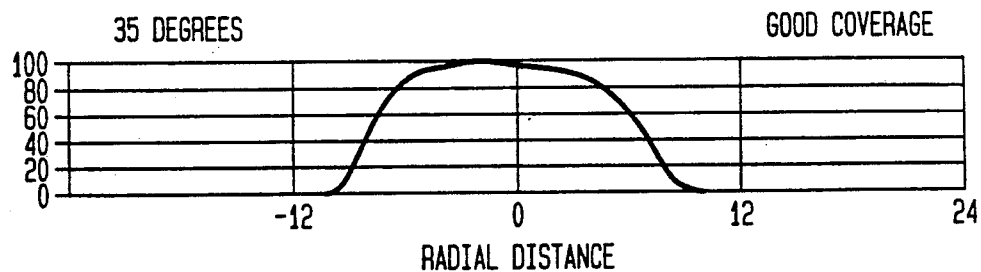
Figure 5B:
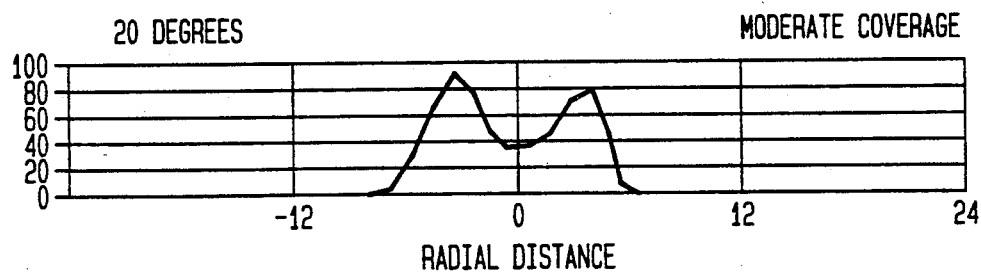
Figure 5C:
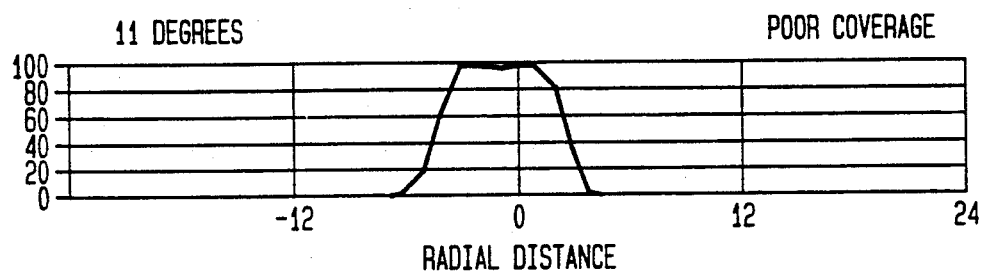
Figure 5D:
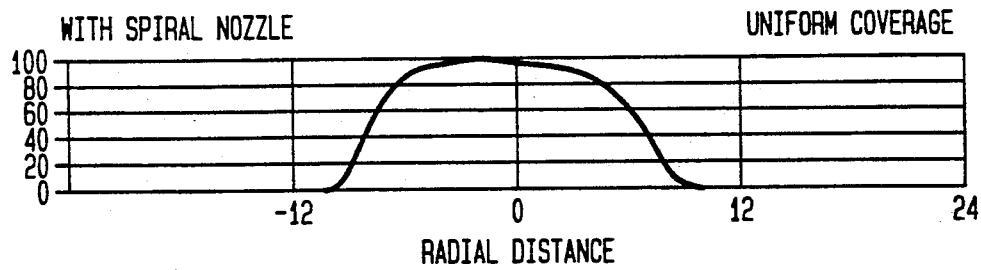
Figure 5E:
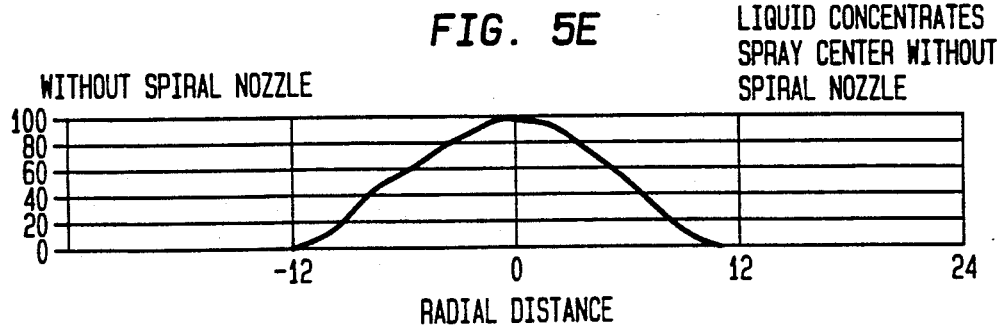

It has been found that a particular orifice plate angle is required for best results, usually between 15° and 50°, with best results being achieved between 20° and 40°. The manner in which the orifice angle is measured is shown in FIG. 4 of the drawings which illustrates a cross-section of the tip of the nozzle pipe 26 with its circularly apertured orifice plate 28. The orifice plate angle A is measured by subtending vectors in the direction of flow contacting the top edge of the orifice plate and the inner edge of the top of the nozzle pipe 29.

As shown in FIG. 1, the atomizing gas is conveniently introduced into the nozzle pipe by means of a perpendicular or right angle connection such as a tee or an elbow. Thus, the atomizing gas has to make a 90° turn before passing up the nozzle pipe to promote atomization around the spray nozzle. It has been found that the perpendicular momentum of the steam tends to make the steam travel up the sector of the nozzle pipe which is opposite the perpendicular gas inlet. Because this results in flow distribution which is less than completely uniform, the flow restrictor collar 25 is cast into the base of the spray nozzle in order to improve flow uniformity of the atomizing gas. However, any means for achieving uniform distribution of the atomizing gas around the nozzle may be employed, for example, guide vanes or a sufficiently long length of nozzle pipe upstream of the spray nozzle in order to permit flow of the atomizing gas to become even and uniform prior to passing around the spray nozzle. The flow restriction is, however, convenient, compact and provides the desired uniformity of flow for the atomizing gas with a relatively low pressure drop. The collar also accelerates the atomizing gas into the conical feed spray and this further improves feed atomization and promotes gas/oil mixing. The clearance between the collar and the nozzle tube will depend upon the amount of atomizing gas desired and again, this will depend upon the size of the unit and available pressure. The optimum value for this parameter may be found by empirical means.

The provision of the ball valve 27 permits maintenance operations to be carried out readily and permits the helical nozzle to be withdrawn from the unit if replacement or cleaning becomes necessary.

Since the orifice plate is subjected to erosion by the droplets of the feed (which may contain particles of catalyst if recycled cracking products are blended with the fresh feed) it may be faced with a wear-resistant material such as tungsten carbide or constructed of a suitable wear-resistant material such as tungsten carbide or a ceramic.

Atomization will also depend on operating conditions including feed oil pressure and flow rate steam pressure and flow rate and the number and size of the nozzles. Generally, conventional operating conditions will be preferred to permit the nozzle to be fitted into existing equipment. Thus, the oil feed pressure will typically be less than 25 psig (275 kPa abs) over riser bottom pressure although variations up to the available oil pressure based on the amount of gas biased to the helical spray nozzle may be employed. Steam flow rate should be adjusted to obtain the desired degree of feed atomization and distribution into the riser; the steam rate per nozzle will typically be about 100-120 SCF/min although higher rates up to about 500 SCF/min e.g. 300-350 SCF/min may be provided for if appropriate.

Both the first and second stage atomizing units are necessary to achieve the desired feed atomization and uniform spray pattern. This is illustrated by FIG. 5 of the drawings which illustrates the effect of varying the angle of the orifice and of the presence and absence of the helical spray nozzle. In FIG. 5, diagrams A, B and C illustrate the effect of varying the angle of the orifice plate from 11° to 35°. These diagrams were obtained by installing a helical vane spray nozzle (120° hollow cone with a flow distribution collar as in FIG. 3) inside a three inch (75 mm) pipe with a two inch (50 mm) orifice in the orifice plate. Water was used to simulate the feed and air was used as the atomizing gas. Feed water pressure was 23.0 psig (260 kPa abs) at 100 gallons per minute (378 l.m.$^{-1}$). The atomizing air was supplied at a rate of 330 SCFM (8860 n.l.m.$^{-1}$) at a pressure of 15 psig (205 kPa abs). The distribution of the liquid droplets at various radial distances (inches) from the central axis of the device is shown in diagrams A, B and C for orifice angles of 35°, 20° and 11°, respectively. These angles were obtained by varying the insertion of the orifice plate in the nozzle pipe. The diagrams show that poor coverage is obtained with an 11° orifice angle which is improved to give a relatively annular distribution at a 20° angle with very uniform coverage obtained at 35°.

Diagrams D and E in FIG. 5 show the effect of the helical vane spray nozzle. These diagrams were obtained in the same general manner as the other diagrams. Diagram D was obtained with the 120° hollow cone helical vane spray nozzle at a feed presure of 17.0 psig (220 kPa) in a three inch (75 mm) nozzle pipe with atomizing air at 110 SCFM (2950 n.l.m.$^{-1}$) using a 35 degree orifice angle. As with diagram A, relatively uniform coverage is attained over a wide range of radial distances. However, if the helical vane nozzle is omitted, the liquid concentrates along the axis of the pipe to produce relatively poor distribution. This is shown by diagram E which was obtained using the same nozzle pipe with atomizing air at 110 SCFM (2950 n.l.m.$^{-1}$) with feed at 5.0 psig (136 kPa abs) at 100 gpm (378 l.m.$^{-1}$), the lower pressure being used to maintain a constant flow rate in the absence of the nozzle.

I claim:
1. A method of catalytically cracking a hydrocarbon oil in a catalytic cracking unit having a cracking riser into which cracking feed oil is fed by means of an injection system and contacted with cracking catalyst at an elevated cracking temperature to crack the oil in the cracking riser and form cracking products which are separated from the caalyst, in which the oil is injected into the cracking riser by:
   (i) forming a conical, atomized spray of the oil by means of a spray nozzle located within a nozzle pipe surrounding the spray nozzle and extending beyond the end of the spray nozzle,
   (ii) confining the conical spray within the nozzle pipe,
   (iii) flowing atomizing gas along the nozzle pipe concurrently with the direction of the atomized feed,
   (iv) passing the atomized feed and atomizing gas through a circular orifice defined by an orificed plate within the nozzle pipe, the orifice being of smaller diameter than the nozzle pipe and defining an angle of from 15° to 50° with the inside edge of the end of the nozzle pipe, to form an expanding spray of atomized feed,
   (v) passing the expanding spray out of the end of the nozzle pipe and into the cracking riser where it contacts the catalyst.
2. A method according to claim 1 in which the atomizing gas comprises steam.
3. A method according to claim 1 in which the circular orifice in the orificed plate defines an angle of from 20° to 40° with the inside edge of the end of the nozzle pipe.
4. A method according to claim 1 in which the spray nozzle comprises a helical vane spray nozzle producing a conical spray pattern having a spray cone angle of at least 90°.
5. A method according to claim 1 in which the pressure of the cracking feed before passing into the spray nozzle is less than 25 psig above the pressure at the bottom of the riser.

* * * * *